Sept. 23, 1958   H. W. BOTELER   2,853,270
DIAPHRAGM VALVES

Filed June 14, 1954   4 Sheets-Sheet 1

INVENTOR.
HENRY W. BOTELER
BY David D. McKenney
ATTORNEY

Sept. 23, 1958  H. W. BOTELER  2,853,270
DIAPHRAGM VALVES

Filed June 14, 1954  4 Sheets-Sheet 2

INVENTOR.
HENRY W. BOTELER
BY David D. McKenney
ATTORNEY

INVENTOR.
HENRY W. BOTELER
BY David D. McKenney
ATTORNEY

Sept. 23, 1958  H. W. BOTELER  2,853,270
DIAPHRAGM VALVES

Filed June 14, 1954  4 Sheets-Sheet 4

INVENTOR.
HENRY W. BOTELER
BY David D. McKenney
ATTORNEY

United States Patent Office 2,853,270
Patented Sept. 23, 1958

2,853,270

DIAPHRAGM VALVES

Henry W. Boteler, East Greenwich, R. I., assignor to Grinnell Corporation, Providence, R. I., a corporation of Delaware Application June 14, 1954, Serial No. 436,280

17 Claims. (Cl. 251—331)

This invention relates to improvements in diaphragm valves and is directed particularly to an improved arrangement for securing the diaphragm to the mechanism by which it is actuated.

Diaphragm valves of the general type to which the present invention relates comprise a body having a passage therethrough which is intersected by a transverse weir. This weir has a concave top surface which extends across the passage and forms a seat for the diaphragm. Opposite the weir the body is provided with an opening which communicates with the passage, and the diaphragm is disposed across this opening with its periphery clamped between the rim thereof and a bonnet mounted thereon which houses most of the actuating mechanism. By this mechanism the diaphragm is moved toward and away from the weir. At all times the diaphragm seals off the actuating mechanism from the fluid flowing through or standing in the body passage.

One of the elements of the actuating mechanism housed within the bonnet is the so-called compressor located adjacent the diaphragm on the side thereof remote from the weir. When the valve is to be closed, the other actuating mechanism elements cause the compressor to advance toward the weir and bulge the diaphragm firmly against the top concave surface thereof, thereby shutting off communication in the passage from one side of the weir to the other. To open the valve the diaphragm must be withdrawn from its contact with the weir and bulged in the opposite direction.

Inasmuch as each of the diaphragms employed in valves of this type is normally made of resilient material preformed with a bulge extending away from the weir, its resiliency will to a certain extent cause it to return to open position when the compressor is withdrawn. In addition the fluid in the valve passage is usually at a pressure higher than atmospheric resulting in a force bulging the diaphragm into this open position when the compressor is withdrawn. It has been discovered in the past, however, that the resiliency of the diaphragm material cannot be relied upon to open the valve either because the diaphragm material is not sufficiently resilient initially or because it loses its resiliency under repeated operation or long periods in closed position. Furthermore, it is sometimes found desirable to preform the diaphragm with a bulge toward the weir which is the closed position of the diaphragm, and finally it is not infrequent that valves of this character are called upon to do service in vacuum systems where the pressure in the passage is less than atmospheric so that the resulting differential in pressure gives rise to a force on the diaphragm tending to close it.

These latter considerations have long since made apparent the need for an attachment between the diaphragm and the actuating mechanism whereby the diaphragm could be positively withdrawn from its engagement with the weir in effecting an opening of the valve. This attachment has heretofore taken the form of a stud with its head embedded in the center of the diaphragm and its shank extending outward therefrom on the side thereof remote from the weir to be engaged by the compressor. In order to embed the stud head in the diaphragm material so as to be securely held therein and prevented from being pulled out, it has been found necessary to provide a greater thickness of diaphragm material at the location of this stud head than in the remainder of the diaphragm, thereby giving rise to the formation of a boss at the center of the diaphragm on the side thereof remote from the weir. In diaphragm valves of large size the compressor surface adjacent the diaphragm has been provided with a recess to receive this boss, and the portion of the compressor which forms the bottom of the recess has had the shank of the stud secured to it.

With the shank of the stud securely fastened to the compressor at the bottom of the compressor recess as for example by a thread engagement, one result is that the diaphragm material located between the stud head and weir is severely squeezed between these elements when the valve is closed. In the large size valves this squeezing action has not proven to be detrimental except where the diaphragm was formed of a fluorocarbon plastic. These plastics, attractive for use in diaphragms because of their corrosion resistant qualities, are less flexible than the more widely used rubber or rubber-like materials and consequently are customarily made thinner than the diaphragms of such rubber or rubber-like material so that the desired flexibility is obtained. However, because these fluorocarbon plastics are also less resilient than the more common rubber and rubber-like diaphragm materials, the severe squeezing which is undergone by that portion of the diaphragm between the stud head and the weir would rupture the fluorocarbon plastic diaphragm at this point after relatively few valve closures. Accordingly, in the large size valves employing fluorocarbon plastic diaphragms provision has been made, as illustrated in my copending patent application Ser. No. 206,221, filed January 16, 1951, now Patent No. 2,725,211, to prevent any closing force from being transmitted to the diaphragm through the stud. Where the diaphragms in these large size valves are of rubber or rubber-like material the extreme resiliency of such material prevents rupture at the critical point across the stud head.

It will be obvious to those skilled in this art that structural arrangements which are suitable in large size diaphragm valves are not equally suitable in very small valves of this type. Thus, diaphragm valves are frequently required in systems where the inside pipe diameter is as small as one half inch. In such small size valves, even the use of a rubber or rubber-like diaphragm does not avoid rupture of the diaphragm material between the stud head and the weir, upon valve closure, when the shank of the stud is rigidly secured to the compressor. The reason for this is that the rubber or rubber-like material across the stud head is very thin and therefore ruptures easily despite its resiliency.

The attachment disclosed in my said application for preventing this rupture is not suitable in the small size valves with which this present invention is primarily concerned because it is undesirable to have to provide small valve compressors with portions thereof engageable by the stud shanks. The present invention is therefore an improved arrangement for securing the stud shank to the actuating mechanism which does not involve securing this shank to the compressor.

In general a valve embodying this invention employs a spindle which is of the usual construction at the end thereof remote from the compressor, for example a spindle threaded for engagement with a fixed bushing rotatably mounted in the bonnet. The other end of the spindle has a head portion adapted to fit part way into a passage extending entirely through the compressor, and a pin passing centrally through this head portion, perpendicular to the spindle axis, pivotally secures the compressor to the spindle. The diaphragm is of rubber or rubber-like material as ordinarily constructed except that the boss at the center thereof has an integral skirt portion spaced from the stud shank and extending therealong such a distance that when this skirt portion is fully inserted into the compressor passage from the end thereof remote from the spindle head the end of this skirt portion engages the end of this head. The shank of the stud extending centrally in the boss skirt is threaded to receive a tube nut which is screwed down on this shank until its threaded end abuts against the diaphragm material. At its other end this tube nut is provided with an elongated loop which extends into a recess in the enlarged spindle head and encircles the pin passing therethrough.

In another embodiment of my invention, I provide a tube nut which differs somewhat from the above described tube nut in that a non-circular head is provided. The valve stem also is of slightly different form in that its lower end is provided with a T-shaped slot which non-rotatably receives and holds the head of the tube nut just described. The lower end of the stem engages the boss portion or skirt of the diaphragm but fails to exert pressure on the tube nut and stud which pressure might undesirably squeeze the portion of the diaphragm between the stud and the seat.

An object of the invention is to provide an improved diaphragm valve in which the stud is engaged by the pin which pivotally connects the compressor to the spindle.

Another object of the invention is to provide an improved diaphragm valve of the described type in which the stud is secured to the spindle through a lost motion connection, whereby the pin exerts a force on the stud to withdraw the diaphragm from the weir during opening of the valve but exerts no force on the stud during closing of the valve.

Still another object of the invention is to provide an improved diaphragm valve in which the diaphragm boss has a portion extending therefrom into engagement with that end of the spindle which is secured to the compressor.

Another object of the invention is to provide a diaphragm valve in which portions of the diaphragm material extending from the diaphragm boss into the compressor are supported by the compressor against deformation.

Another object of the invention is to provide a diaphragm valve in which portions of the diaphragm material extending from the diaphragm boss along the stud shank in spaced relation thereto are supported against deformation by a member surrounding this stud shank.

A further object of the present invention is to provide an improved diaphragm valve wherein the diaphragm stud is operatively associated with the stem so as to positively move away from the valve seat in response to movement of the stem in one direction and to be inoperative to effect movement of the stud in response to movement of the stem in an opposite direction.

A still further object of the present invention is to provide an improved diaphragm valve wherein the operative connection of the stud to the stem obviates the necessity of a connection of the stud with the compressor.

Thus far attention has been particularly directed to a diaphragm valve embodying my improvements in which the diaphragm is of rubber or rubber-like material as distinguished from the materials exemplified by fluorocarbon plastic. It will be understood, however, that the diaphragm may be of any suitable material including materials exemplified by these fluorocarbon plastics. However, when these latter mentioned materials are employed it is preferred that a slightly different arrangement be used, and my improvements with some modification are equally advantageous in this different arrangement. In general it is preferred that a valve with such a fluorocarbon plastic diaphragm or a diaphragm of similar material have no portion of the diaphragm material extending from its boss and that there be interposed between the diaphragm and the compressor a backing sheet of very resilient material, for example, rubber or rubber-like material. The backing sheet is shaped much like the diaphragms of the earlier described embodiment, having, however, a recess on one of its sides to receive the diaphragm boss and further having an opening through its center into which the stud shank may be extended.

Accordingly, it is a further object of my invention to provide a diaphragm valve of the kind requiring a backing sheet for the diaphragm in which valve there is omitted from the compressor an integral compressor portion across the compressor recess which receives the backing sheet boss.

Another object of the invention is to provide a diaphragm valve of the kind requiring a backing sheet for the diaphragm in which the shank of the stud embedded in the diaphragm extends through an opening in the backing sheet boss and is engaged by the pin which pivotally connects the compressor to the spindle.

Another object of the invention is to provide a diaphragm valve of the kind requiring a backing sheet for the diaphragm in which the stud is secured to the described pin through a lost motion connection as set forth in an earlier object.

Another object of the invention is to provide a diaphragm valve of the kind requiring a backing sheet for the diaphragm wherein the backing sheet boss extends into engagement with that end of the spindle which is secured to the compressor.

Another object of the invention is to provide a diaphragm valve of the kind requiring a backing sheet for the diaphragm in which the portion of the backing sheet boss extending into the compressor is supported by the compressor against deformation.

And another object of the invention is to provide a diaphragm valve of the kind requiring a backing sheet for the diaphragm in which the portion of the backing sheet boss extending along the stud shank in spaced relation thereto is supported against deformation by a member surrounding this stud shank.

The best modes in which it has been contemplated applying the principles of the present invention are shown in the accompanying drawings but the latter are to be deemed primarily illustrative because it is intended that the patent shall cover by suitable expression in the appended claims whatever features of patentable novelty exist in the invention disclosed.

Embodiment of Figures 1 to 4

Figure 1:
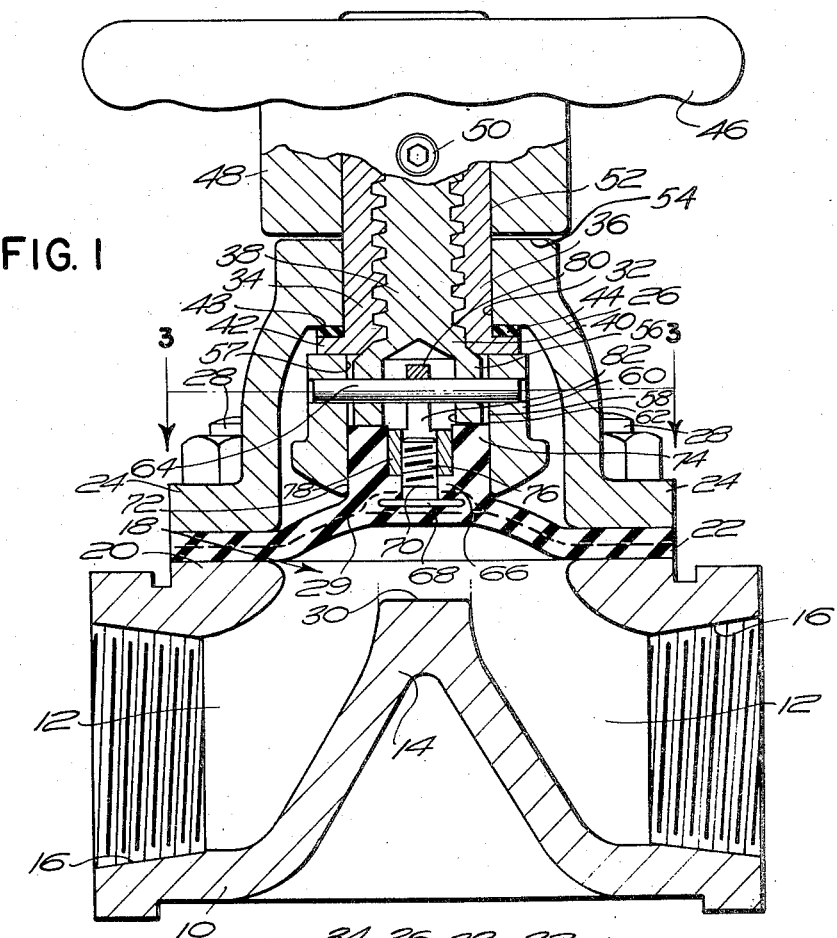
Figure 1 is a sectioned side elevation view of a valve embodying the inventive improvements, the valve being of the kind employing a rubber or rubber-like diaphragm and being shown in the open position.

Referring now more particularly to Figures 1 to 4 of the drawings, the valve therein shown has a body 10 with a passage 12 therethrough interrupted by a weir 14. At the ends of the passage 12, the body is provided with usual means, for example internal threads 16, for connecting the valve into a fluid system (not shown). On the side of the passage opposite the weir the body is provided with an opening 18 (see Figure 4) having a flange 20 therearound. A flexible diaphragm 22 is disposed across this opening 18 with its edge portions overlying the flange 20 and clamped thereagainst by a corresponding flange 24 on a bonnet 26 secured to the body by bolts 28 which pass through these flanges and the diaphragm edge portions therebetween. The diaphragm is of usual rubber or rubber-like material in this embodiment and preferably is preformed so that when clamped as described its unclamped center portion 29 bulges away from the weir and provides communication between the passage portions on either side thereof across the weir top surface 30. Valve closure is effected by exerting a force on the side of the diaphragm's unclamped center portion which is remote from the weir to reverse the bulge in this center portion and press the same firmly against the weir seating surface 30. This weir top surface 30 is concaved to accommodate the reversed diaphragm bulge and the ends of the weir top surface merge smoothly with the surface of the flange 20 against which the diaphragm edge portions are clamped. Thus, communication across the weir top surface is prevented.

The bonnet 26 serves to house the actuating mechanism by which the closing force referred to is exerted and by which withdrawal of the diaphragm from the weir is accomplished to open the valve. The end of the bonnet remote from the body is closed except for an opening 32 therein disposed so that its axis passes through substantially the center of the unclamped diaphragm portion. This opening serves as a journal for a hollow bushing 34 which is internally threaded, as at 36, to accommodate the externally threaded end 38 of a spindle 40. One end of the bushing 34 extends into the interior of the bonnet and carries an outstanding flange 42 which overlies the rim 43 of opening 32. A thrust bearing washer 44 is interposed between this flange and this opening rim.

The other end of the bushing 34 extends out of bonnet opening 32 and is provided with a handwheel 46 having a hub portion 48 secured to this last mentioned bushing end by a set screw 50. The handwheel hub portion 48 has its end face 52 adjacent the rim 54 around the opening 32 and is secured to the bushing 34 so that the flange 42 thereon holds the washer 44 against its opening rim 43. By this described arrangement, rotation of the handwheel rotates the bushing, and the latter is restricted against axial movement.

The spindle 40 has an enlarged end 56 which is coaxial with the threaded portion and is located within the bonnet beyond the bushing 34. This enlarged end fits into one end 57 of a passage 58 extending completely through a compressor 60 and is provided with a central recess 62. A pin 64 having its ends mounted in the compressor on opposite sides of the passage 58 and passing through the spindle end 56 and recess 62 therein serves to pivotally secure the compressor to the spindle. The pin is so disposed and the clearance between the spindle end 56 and compressor passage walls is such that the compressor can rock slightly in the plane of the weir about the pin 64, the plane of the weir being at right angles to the paper and containing the spindle 40.

At the center of the unclamped diaphragm portion 29 and on the side thereof remote from the weir there is a boss 66 preferably of the same material as the diaphragm and integral therewith which has embedded therein the head 68 of a stud 70. This boss is fully inserted into the compressor passage at the end 72 thereof opposite the passage end receiving the spindle, and an annular skirt 74 integral with the boss extends therefrom along the passage 58 into contact with the spindle end 56.

The shank 76 of the stud 70 extends out of the boss and is externally threaded to receive the internal threads of a cylindrical tube nut 78 which is turned down on this stud shank until its end contacts the boss. The side of the boss and the outer side of the annular skirt extending therefrom fit snugly against the walls of the compressor passage 58, and similarly the inner side of the skirt fits snugly against the outer surface of the tube nut throughout substantially the entire length of the skirt.

The tube nut 78 is provided with a flat portion 80 which extends into the recess 62 in the spindle end 56 and which has an elongated slot 82 therein receiving the pin 64 therethrough. This slot is closed and is somewhat longer than the diameter of the pins 64 so as to permit some movement of the latter with respect to the tube nut along the slot. The purpose of this slot will presently appear.

Figure 2:
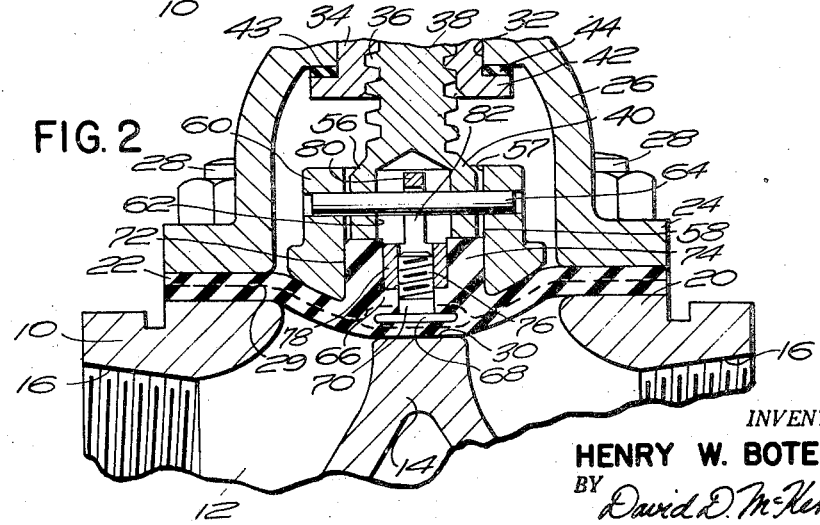
Figure 2 is a fragmentary view similar to Figure 1, except that the valve is shown in the closed position.
Figure 3:
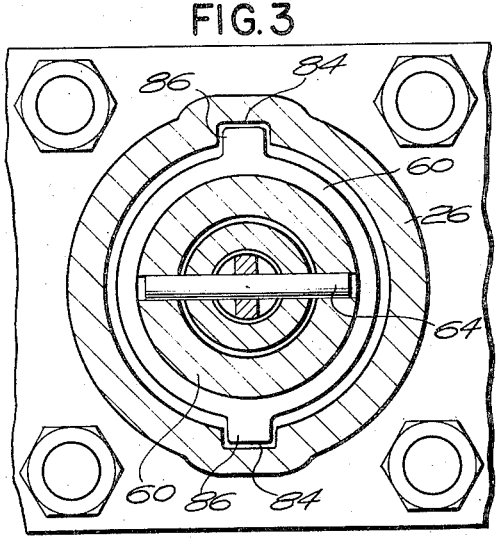
Figure 3 is a plan view taken as on line 3—3 of Figure 1.
Figure 4:
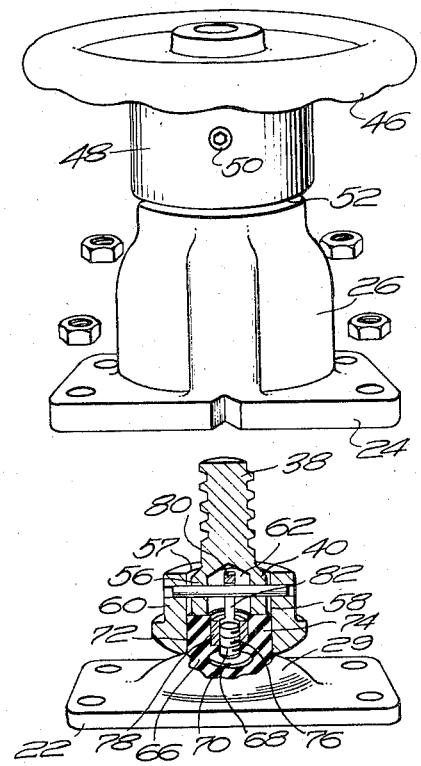
Figure 4 is a partially exploded perspective view of the valve of Figure 1, showing certain parts in section.
Figure 4:
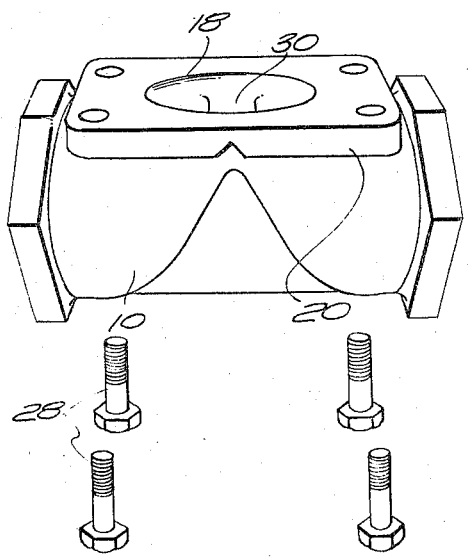
Figure 5:
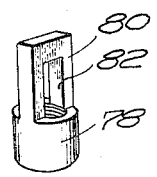
Figure 5 is a perspective view of the tube nut by which the diaphragm stud is secured to the actuating mechanism.

The side of the compressor adjacent to the diaphragm 22 has a configuration which matches that of the side of the diaphragm remote from the weir when the diaphragm is lying thereagainst (see Figure 2).

The bonnet is conventionally provided on its interior surface with diametrically opposed grooves 84 extending from the ends of the weir parallel to the axis of the spindle (see Figure 3), and the compressor has diametrically opposed fingers 86 which project into those grooves and are slidable therealong.

Operation

Considering now the operation of the embodiment thus described, assume first that the valve is in the open position shown in Figure 1, that is the valve position wherein the diaphragm is spaced apart from its seat on the weir top surface 30. Rotation of the handwheel 46 in one direction produces like rotation of the bushing 34. Inasmuch as this bushing is restricted against axial movement, and the spindle 40 is restricted against rotative movement by its connection with the compressor 60 which is prevented from such movement by fingers 86 engaging the bonnet grooves 84, therefore, the interaction of the spindle and bushing threads when the bushing is rotated in the proper direction advances the spindle axially toward the body. This spindle movement in turn moves the compressor and eventually the diaphragm is pressed firmly against its seating on the weir top surface.

It will be noted that the compressor passage 58 is proportionately quite large in comparison with the compressor itself. The reason for this is that valves herein shown are small, for example, valves for use in pipe lines having diameters down to about one half inch, and accordingly, such components as the stud 70 and diaphragm boss 66 must be of the proportionate size shown to have sufficient strength and be easy to manufacture. The result of these proportions is that the compressor itself engages a relatively small part of the diaphragm across the weir, and a relatively large part of the diaphragm across the weir at the center thereof is not pressed thereagainst by this compressor. It is necessary, however, that this latter part of the diaphragm across the weir be so pressed to effect a tight seating, and this is accomplished by having the skirt 74 engaged by the spindle end 56. Since this skirt is preferably formed of the same rubber or rubber-like material as the diaphragm and diaphragm boss and since the force exerted on the end of this skirt by the spindle is transmitted through the skirt material to the diaphragm, it is necessary to confine the sides of the skirt in order to prevent deformation thereof which would reduce the force transmitted to the diaphragm. This confinement is achieved by having the outer sides of the boss and skirt fit closely against the walls of the compressor passage 58 and by having the threaded end of the tube nut completely occupy the space between the threaded stud shank and the inner side of the skirt.

It will be appreciated that in the small size diaphragm valves shown the thickness of diaphragm material between the stud head 68 and the weir surface 30 is not great. Likewise it will be appreciated that the area of this stud head which is presented toward the weir is likewise not great. As a result of these two considerations it will be understood that the exertion of any substantial closing force on the diaphragm through the stud would severely squeeze the thin layer of diaphragm material between the stud head and weir, and a rupture of this layer would be likely. Because of this it has been found preferable to exert no closing force through the stud, and hence the provision in the present invention of the elongated slot 82 in the flat portion of the tube nut which connects the stud to the pin 64. Thus in Figure 2 it will be seen that the pin 64 is exerting no downward force on the tube nut and has in fact, moved slightly away from the end of the slot shown to be engaging it in Figure 1, this separation being due to the compression of the diaphragm material in closed position. In effecting closure the force exerted on the diaphragm by the compressor and on the skirt by the spindle is sufficient to achieve tight seating of the diaphragm against the weir even with respect to the diaphragm material between the stud head and weir.

To open the valve the handwheel is rotated in the direction opposite to that which effected closure, thereby moving the spindle, compressor and pin away from the weir. The pin 64 engages the end of the elongated slot in the tube nut flat portion 80 and draws this tube nut with it. The tube nut in turn carries along the stud and diaphragm and separates the latter from its engagement with the weir seat.

Figure 6:
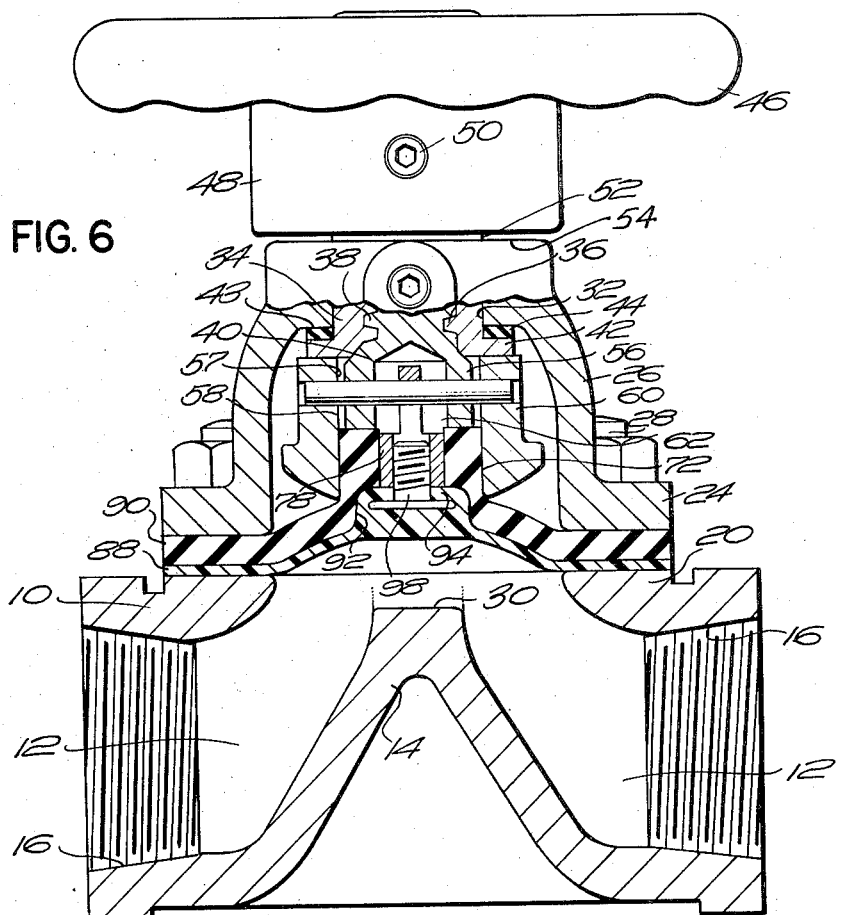
Figure 6 is a vertical longitudinal sectional view of another valve embodying the inventive improvement, this valve being of the kind which requires a backing sheet for the diaphragm and being shown in the open position.
Figure 7:
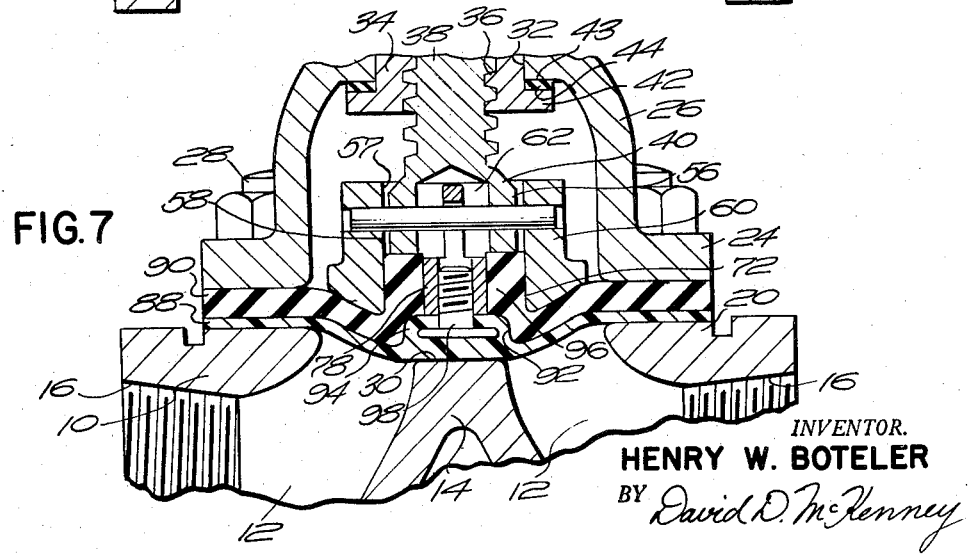
Figure 7 is a fragmentary view similar to Figure 6, except that the valve is shown in the closed position.

Embodiment of Figures 6 and 7

The embodiment of the present invention shown in Figures 6 and 7 is similar in construction to the valve already described, except that it employs what shall be termed herein a "plastic" diaphragm and backing sheet. By plastic diaphragm is meant a diaphragm of material sufficiently non-resilient and flexible as to require that it be provided with a backing sheet of a more resilient and flexible material between it and the compressor to prevent diaphragm rupture. One example of such a plastic material is trifluorochloroethylene. Such material enjoys widespread use in diaphragm valve diaphragms because it is unaffected by acid and alkali solutions which these valves are frequently called upon to handle. However, because of the relative inflexibility of this material, as compared with rubber or rubber-like material, plastic diaphragms must be made thin in cross section to permit their being bulged without undue force during valve operation; and because of their relative non-resilience, as compared with rubber or rubber-like material, these thin plastic diaphragms are readily ruptured when squeezed between metal surfaces. Accordingly, plastic diaphragms preferably should be used with the more resilient and flexible backing sheets referred to.

Referring now more particularly to Figures 6 and 7 a plastic diaphragm is employed having a backing sheet 90 arranged with respect thereto substantially as shown. This backing sheet has the general configuration of the rubber or rubber-like diaphragm 22 earlier described except that a recess 92 is provided to receive a boss 94 on the plastic diaphragm and the inner side of a backing sheet skirt 96 (equivalent to the skirt 74 in the previous figures) extends to the recess 92. A stud 98 is embedded in the plastic diaphragm boss 94 with its threaded shank extending centrally of the skirt 96, and the tube nut 78 is threaded down on this shank against the boss 94.

Figure 8:
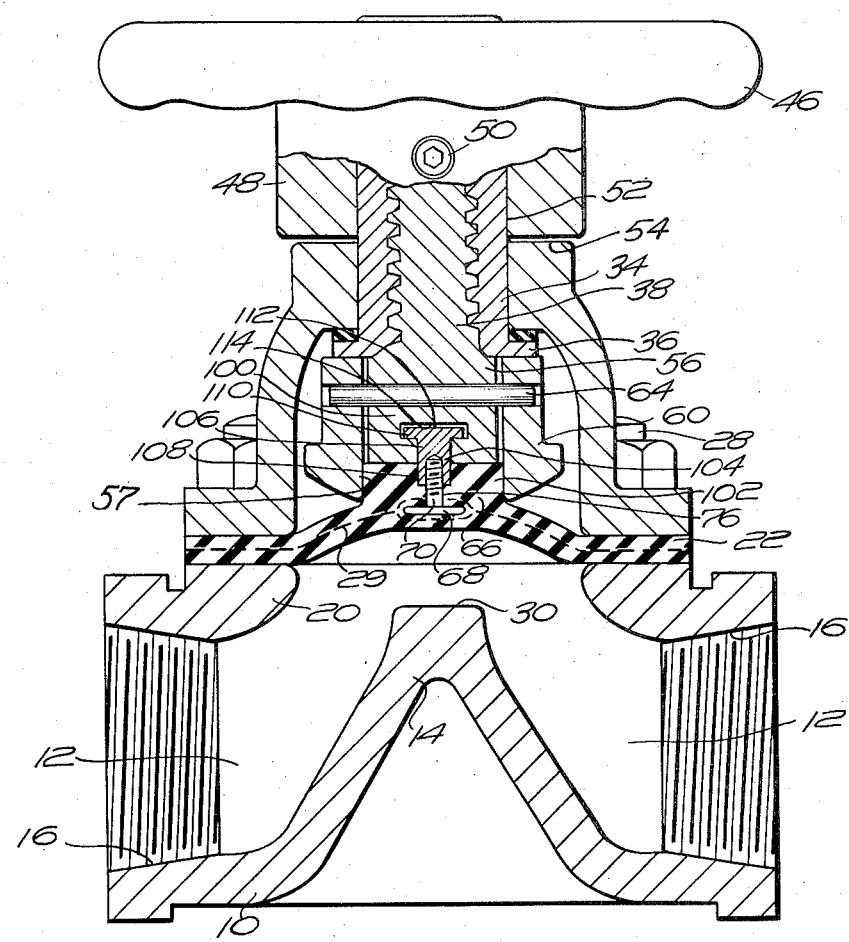
Figures 8 and 9 are views showing a modified form of the invention.
Figure 9:
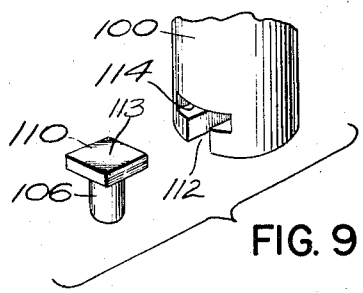

Embodiment of Figures 8 and 9

The embodiment of Figures 8 and 9 differs from the embodiment of Figures 1 to 4 in that the lower end of the stem and the tube nut are of slightly different construction as will presently be pointed out. The remainder of the valve construction is substantially the same as in Figures 1 to 4 and consequently like numerals have been employed. The stem 56 has a solid lower end portion 100 extending into the bore 57 of the compressor 60 for engagement with the upper surface of the boss portion or skirt 102 of the diaphragm. The stud 68 is threadedly engaged in the internally threaded shank 104 of the tube nut 106 which in turn is seated in the recess 108 of the boss 102. To non-rotatably hold the tube nut 106 and to provide for positive withdrawing movement of the diaphragm, the tube nut 106 is provided with a non-circular, preferably square head 110 which in turn is seated in the T-shaped slot 112 cut in the lower end 100 of the stem. Sufficient clearance is provided between the surface 113 of the head 110 and the surface 114 to prevent contact of the stem surface 114 with the tube nut prior to contact of the stem with the skirt 102 of the diaphragm. Of course, the pin 64 supports the compressor 60 on the stem for movement thereby.

The embodiments of the present invention thus described accomplish the objects earlier stated.

By securing the diaphragm stud to an element other than the compressor it is unnecessary to provide an integral compressor portion to engage this stud.

By providing a lost motion connection between the stud and the element referred to, movement of this element to open the valve withdraws the diaphragm from the weir, but movement of the element to close the valve does not result in any force being transmitted to the diaphragm through the stud.

By providing an integral skirt on the diaphragm boss or on the diaphragm backing sheet which skirt engages the spindle a force is exerted, during closing, on the central diaphragm portion below this skirt to press this portion against the weir.

By closely confining this integral skirt with the members surrounding it, force exerted thereon by the spindle may be transmitted therethrough to the diaphragm without deformation of this skirt.

I claim:

1. In a diaphragm valve having a seat and a diaphragm adapted to engage said seat when flexed in one direction and adapted to withdraw from said seat when flexed in the opposite direction, a valve stem spaced apart from the side of the diaphragm which is remote from the seat, means for reciprocating the stem in the two said directions, a compressor carried by the stem and engaging the diaphragm on the said side thereof, means carried by the stem separate from the compressor, and connecting means carried by the diaphragm and projecting from the said side thereof to directly engage the separate means so that upon predetermined movement of the stem the diaphragm is moved by engagement between said separate means and said connecting means and upon opposite movement of the stem said connecting means disengages said separate means and effects movement of said diaphragm by direct engagement therewith.

2. In a diaphragm valve having a diaphragm adapted to engage a seat when flexed in one direction and adapted to withdraw from said seat when flexed in the opposite direction, a valve stem spaced apart from the side of the diaphragm which is remote from the seat, means for reciprocating the stem in the two said directions, a compressor engaging the diaphragm on the said side thereof, means coupling the compressor to the stem, and connecting means carried by the diaphragm and projecting from the said side thereof to directly engage the coupling means so that upon predetermined movement of the stem movement of the diaphragm is effected.

3. In a diaphragm valve having a diaphragm adapted to engage a seat when flexed in one direction and adapted to withdraw from said seat when flexed in the opposite direction, a valve stem spaced apart from the side of the diaphragm which is remote from the seat, means for reciprocating the stem in the two said directions, a compressor engaging the diaphragm on the said side thereof, means pivotally coupling the compressor to the stem, stud means carried by the diaphragm and projecting from the said side thereof toward the stem substantially coaxially therewith, and connecting means carried by said stud to directly engage the coupling means so that upon predetermined movement of the stem movement of the diaphragm is effected.

4. In a diaphragm valve having a diaphragm adapted to engage a seat when flexed in one direction and adapted to withdraw from said seat when flexed in the opposite direction, apparatus for effecting such flexing which comprises a valve stem spaced apart from the side of the diaphragm which is remote from the seat, means for reciprocating the stem in the two said directions, stud means carried by the diaphragm and projecting from the said side thereof toward the stem substantially coaxially therewith, a compressor engaging the diaphragm on the said side thereof and having a passage accommodating the projecting stud, means extending across the compressor passage to pivotally couple the compressor to the stem, and connecting means carried within the passage by the stud to directly engage the coupling means so as to effect movement of the diaphragm upon predetermined movement of the coupling means.

5. In a diaphragm valve having a diaphragm adapted to engage a seat when flexed in one direction and adapted to withdraw from said seat when flexed in the opposite direction, apparatus for effecting such flexing which comprises a valve stem spaced apart from the side of the diaphragm which is remote from the seat, means for reciprocating the stem in the two said directions, means carried by the diaphragm and projecting from the said side thereof toward the stem substantially coaxially therewith, a compressor engaging the diaphragm on the said side thereof and having a passage which accommodates and is substantially coaxial with the projecting means, means extending across the compressor passage perpendicular to the axis thereof to pivotally couple the compressor to the stem, and connecting means carried by the projecting means within the passage which is engaged by the coupling means upon substantial movement of the stem in the second mentioned direction and which is freed from engagement by the coupling means when the stem is moved in the first mentioned direction to squeeze the diaphragm between the compressor and the seat.

6. In a diaphragm valve having a diaphragm adapted to engage a seat when flexed in one direction and adapted to withdraw from said seat when flexed in the opposite direction, a valve stem spaced apart from the side of the diaphragm which is remote from the seat, means for reciprocating the stem in the two said directions, non-resilient connecting means carried by the diaphragm and projecting from the said side thereof toward the stem, a compressor carried by the stem and engaging the diaphragm on the said side thereof, a passage in the compressor accommodating the projecting connecting means, resilient means interposed within the compressor passage around the projecting connecting means and extending between the diaphragm and the stem, and means carried by the stem to engage the projecting connecting means for effecting predetermined movement of the latter and providing for lost motion.

7. In a diaphragm valve having a diaphragm adapted to engage a seat when flexed in one direction and adapted to withdraw from said seat when flexed in the opposite direction, apparatus for effecting such flexing which comprises a valve stem spaced apart from the side of the diaphragm which is remote from the seat, means for reciprocating the stem in the two said directions, stud means carried by the diaphragm and projecting from the said side thereof toward the stem substantially coaxially therewith, an integral diaphragm skirt portion surrounding and spaced apart from the projecting stud and extending therealong into engagement with the stem so as to resiliently move in cooperation therewith, a compressor carried by the stem and engaging the portion of said side of the diaphragm which surrounds the skirt, a compressor passage housing the skirt and having its walls in substantial contact with the outer sides thereof, and connecting means connecting the projecting stud to the stem, said connecting means having one portion in substantial contact with the inside surface of the skirt.

8. In a diaphragm valve having a diaphragm adapted to engage a seat when flexed in one direction and adapted to withdraw from said seat when flexed in the opposite direction, apparatus for effecting such flexing which comprises a valve stem spaced apart from the side of the diaphragm which is remote from the seat, means for reciprocating the stem in the two said directions, a stud having its head embedded in the diaphragm and having its shank projecting from the said side thereof toward the stem substantially coaxially therewith, an integral diaphragm skirt portion surrounding the projecting shank and extending therealong in spaced relation therewith to engage the stem, a compressor interposed between the stem and the diaphragm and engaging that portion of the said side of the latter which surrounds the skirt, said compressor having a passage through which the skirt extends and against the walls of which the outer side of the skirt is in substantially continuous contact, means connecting the compressor to the stem and extending across the compressor passage, coupling means having a portion which is secured to the shank and against which the inner side of the skirt is in substantially continuous contact and having another portion which is engaged by the connecting means.

9. In a diaphragm valve having a diaphragm adapted to engage a seat when flexed in one direction and adapted to withdraw when flexed in the opposite direction, a pair of elements, one of said elements being a valve stem and the other being a compressor carried by the valve stem and engageable with the diaphragm, means for reciprocating at least one of said elements in the two said directions, and means interconnecting the diaphragm with at least one of said elements for effecting flexing of the diaphragm in said opposite direction only.

10. In a diaphragm valve having a diaphragm adapted to engage a seat when flexed in one direction and adapted to withdraw from said seat when flexed in the opposite direction, a reciprocable valve stem, means for reciprocating the valve stem in said two directions, a compressor carried by the stem for movement therewith and engageable with the diaphragm, and means interconnecting the diaphragm with said stem for effecting flexing of the diaphragm in said opposite direction only.

11. In a diaphragm valve having a diaphragm adapted to engage a seat when flexed in one direction and adapted to withdraw when flexed in the opposite direction, a pair of reciprocable elements, one of said elements being a valve stem and the other being a compressor engageable with said diaphragm, means for reciprocating the stem in the two said directions, means interconnecting the compressor with the stem for movement therewith, and means interconnecting the diaphragm with said last recited means for effecting flexing of the diaphragm in said opposite direction only.

12. In a diaphragm valve having a diaphragm adapted to engage a seat when flexed in one direction and adapted to withdraw from said seat when flexed in the opposite direction, a valve stem spaced apart from the side of the diaphragm which is remote from the seat, means for reciprocating the stem in the two said directions, connecting means carried by the diaphragm and projecting from the said side thereof toward the stem, a compressor carried by the stem and engaging the diaphragm on the said side thereof, a passage in the compressor accommodating the projecting connecting means, resilient means interposed within the compressor passage around the projecting connecting means and extending between the diaphragm and the stem, said connecting means including lost motion means, said lost motion means including a pair of elements, one of which is carried by the stem and engageable with the other of said elements which is carried by the diaphragm whereby the diaphragm is flexed by said stem and lost motion means in said opposite direction only and by said stem alone in said one direction.

13. In a diaphragm valve having a diaphragm adapted to engage a seat when flexed in one direction and adapted to withdraw from said seat when flexed in the opposite direction and having a resilient backing sheet adjacent the diaphragm on the side thereof remote from the seat, a valve stem spaced apart from the backing sheet on the side thereof remote from the diaphragm, means for reciprocating the stem in the two said directions, a compressor carried by the stem and engaging the backing sheet on the said side thereof, means carried by the stem separate from the compressor, and connecting means carried by the diaphragm and projecting from the said side thereof through the backing sheet to directly engage the separate means so that upon movement of the stem and the separate means predetermined movement of the diaphragm is effected.

14. In a diaphragm valve, a seat, a diaphragm adapted to engage said seat when flexed in one direction and adapted to withdraw when flexed in the opposite direction, a pair of elements one of which is a valve stem having one end opposing said diaphragm, the other of said elements being a reciprocable compressor operatively connected with said stem and provided with a bore aligned with said seat, said diaphragm having an attachment stud embedded therein and substantially aligned with said bore and having a skirt surrounding said stud extending into said bore for engagement by one of said elements so as to be moved in said one direction with only resilient pressure acting on said stud, and means operatively connecting said stud with at least one of said elements for movement in said opposite direction.

15. In a diaphragm valve, a seat, a diaphragm adapted to engage said seat when flexed in one direction and adapted to withdraw when flexed in the opposite direction, a pair of reciprocable elements one of which is a valve stem having one end opposing said diaphragm, the other of said elements being a compressor coupled with said stem and provided with a bore aligned with said seat, said diaphragm having an attachment stud embedded therein and substantially aligned with said bore and having a skirt surrounding said stud extending into said bore for engagement by one of said elements so as to be moved in said one direction with only resilient pressure acting on said stud, and means operatively connecting said stud with said stem for movement therewith in said opposite directon only.

16. In a diaphragm valve, a seat, a diaphragm adapted to engage said seat when flexed in one direction and adapted to withdraw when flexed in the opposite direction, a pair of reciprocable elements one of which is a valve stem having one end opposing said diaphragm, the other of said elements being a compressor coupled with said stem and provided with a bore into which an end portion of the stem projects, said diaphragm having an attachment stud embedded therein and substantially aligned with said stem, said diaphragm having a skirt surrounding said stud extending into said bore for engagement by said stem end so as to be moved in said one direction with only resilient pressure acting on said stud, said one end of the stem having a T-shaped slot and a nut connected with said stud and having a head non-rotatably received in said slot, said nut head and the slot therefor being so related that movement of the nut by the stem is directly effected in said opposite direction only.

17. In a diaphragm valve having a diaphragm of resilient material adapted to engage a seat when flexed in one direction and adapted to withdraw from said seat when flexed in the opposite direction, a valve stem spaced apart from the side of the diaphragm which is remote from the seat and having a surface presented toward the diaphragm, a compressor carried by the stem, means for reciprocating the stem in the two said directions, connecting means carried by the diaphragm and projecting from the said side thereof toward the stem, means formed of said diaphragm material which extends toward and engages the said stem surface and means securing the projecting connecting means to the stem for providing lost motion between said stem and said connecting means during at least a portion of the stem travel.

References Cited in the file of this patent

UNITED STATES PATENTS

| | | |
|---|---|---|
| 2,096,528 | Saunders | Oct. 19, 1937 |
| 2,283,369 | Jacobsen | May 19, 1942 |
| 2,654,559 | Franck | Oct. 6, 1953 |
| 2,684,829 | McFarland | July 27, 1954 |
| 2,716,017 | Linker | Aug. 23, 1955 |